(12) United States Patent
Ma et al.

(10) Patent No.: US 12,348,322 B2
(45) Date of Patent: Jul. 1, 2025

(54) USING PARTIALLY DECODED PACKETS FOR ERROR MITIGATION AT A VOICE DECODER

(71) Applicant: QUALCOMM Incorporated, San Diego, CA (US)

(72) Inventors: Liangping Ma, San Diego, CA (US); Alberto Rico Alvarino, San Diego, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/812,992

(22) Filed: Jul. 15, 2022

(65) Prior Publication Data

US 2023/0019478 A1   Jan. 19, 2023

Related U.S. Application Data

(60) Provisional application No. 63/203,316, filed on Jul. 16, 2021.

(51) Int. Cl.
| | |
|---|---|
| *H04L 1/20* | (2006.01) |
| *H04L 1/00* | (2006.01) |
| *H04L 65/65* | (2022.01) |
| *H04W 28/06* | (2009.01) |

(52) U.S. Cl.
CPC ............ *H04L 1/203* (2013.01); *H04L 1/0061* (2013.01); *H04L 65/65* (2022.05); *H04W 28/06* (2013.01)

(58) Field of Classification Search
CPC ....... H04L 1/203; H04L 65/65; H04L 1/0061; H04W 28/06
See application file for complete search history.

(56) References Cited

U.S. PATENT DOCUMENTS

| | | | | |
|---|---|---|---|---|
| 5,574,495 A | * | 11/1996 | Caporizzo | .............. H04N 17/00 348/192 |
| 6,700,902 B1 | * | 3/2004 | Meyer | ................... H04W 28/06 370/468 |
| 2007/0127562 A1 | * | 6/2007 | Gehring | .................. H04L 1/203 375/227 |
| 2020/0014520 A1 | | 1/2020 | Xu et al. | |

FOREIGN PATENT DOCUMENTS

| | | |
|---|---|---|
| CN | 103971695 B | 3/2017 |
| EP | 3229393 A1 | 10/2017 |
| JP | H0715353 A | 1/1995 |

OTHER PUBLICATIONS

International Search Report and Written Opinion—PCT/US2022/073848—ISA/EPO—Feb. 1, 2023.
Partial International Search Report—PCT/US2022/073848—ISA/EPO—Nov. 8, 2022.

* cited by examiner

*Primary Examiner* — Brenda H Pham
(74) *Attorney, Agent, or Firm* — Harrity & Harrity, LLP

(57) ABSTRACT

Various aspects of the present disclosure generally relate to wireless communication. In some aspects, a network node may obtain an erroneous packet from a first communication device. The network node may output an indication of bit error rate information, based on the erroneous packet, to a second communication device to facilitate error mitigation at the second communication device. Numerous other aspects are described.

16 Claims, 9 Drawing Sheets

USING PARTIALLY DECODED PACKETS FOR ERROR MITIGATION AT A VOICE DECODER

CROSS-REFERENCE TO RELATED APPLICATION

This Patent Application claims priority to U.S. Provisional Patent Application No. 63/203,316, filed on Jul. 16, 2021, entitled "USING PARTIALLY DECODED PACKETS FOR ERROR MITIGATION AT A VOICE DECODER," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using partially decoded packets for error mitigation at a voice decoder.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a base station. The method may include obtaining an erroneous packet from a first communication device. The method may include outputting an indication of bit error rate (BER) information, based on the erroneous packet, to a second communication device to facilitate error mitigation at the second communication device.

Some aspects described herein relate to a method of wireless communication performed by a first communication device. The method may include determining BER information associated with reception, by the first communication device, of voice communications from a second communication device. The method may include obtaining one or more voice communications from a communication device. The method may include determining bit error rate (BER) information associated with the one or more voice communications. The method may include obtaining a plurality of voice packets from the communication device. The method may include decoding, based at least in part on the BER information, at least a portion of at least one voice packet of the plurality of voice packets to generate at least one partially decoded voice packet. The method may include generating voice data using the at least one partially decoded voice packet.

Some aspects described herein relate to a network node for wireless communication. The network node may include a memory and one or more processors coupled to the memory. The one or more processors may be configured to obtain an erroneous packet from a first communication device. The one or more processors may be configured to output an indication of BER information, based on the erroneous packet, to a second communication device to facilitate error mitigation at the second communication device.

Some aspects described herein relate to an apparatus for wireless communication. The apparatus may include a memory and one or more processors coupled to the memory. The one or more processors may be configured to obtain one or more voice communications from a communication device. The one or more processors may be configured to determine BER information associated with the one or more voice communications. The one or more processors may be configured to obtain a plurality of voice packets from the communication device. The one or more processors may be configured to decode, based at least in part on the BER information, at least a portion of at least one voice packet of the plurality of voice packets to generate at least one partially decoded voice packet. The one or more processors may be configured to generate voice data using the at least one partially decoded voice packet.

Some aspects described herein relate to a non-transitory computer-readable medium that stores a set of instructions for wireless communication by a network node. The set of instructions, when executed by one or more processors of the network node, may cause the network node to obtain an erroneous packet from a first communication device. The set of instructions, when executed by one or more processors of the network node, may cause the network node to output an indication of bit error rate (BER) information, based on the erroneous packet, to a second communication device to facilitate error mitigation at the second communication device.

Some aspects described herein relate to a non-transitory computer-readable medium that stores a set of instructions for wireless communication by an apparatus. The set of instructions, when executed by one or more processors of the apparatus, may cause the apparatus to obtain one or more voice communications from a communication device and determine BER information associated with the one or more voice communications. The set of instructions, when executed by one or more processors of the first communication device, may cause the apparatus to obtain a plurality of voice packets from the communication device and decode, based at least in part on the BER information, at least a portion of at least one voice packet of the plurality of voice packets to generate at least one partially decoded voice packet. The set of instructions, when executed by one or more processors of the first communication device, may cause the first communication device to generate voice data using the at least one partially decoded voice packet.

Some aspects described herein relate to an apparatus for wireless communication. The apparatus may include means for obtaining an erroneous packet from a first communication device. The apparatus may include means for outputting an indication of bit error rate (BER) information, based on the erroneous packet, to a second communication device to facilitate error mitigation at the second communication device.

Some aspects described herein relate to an apparatus for wireless communication. The apparatus may include means for determining BER information associated with reception of voice communications from a communication device. The apparatus may include means for receiving a plurality of voice packets from the communication device. The apparatus may include means for generating voice data using, based at least in part on the BER information, at least one partially decoded voice packet of the plurality of voice packets.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
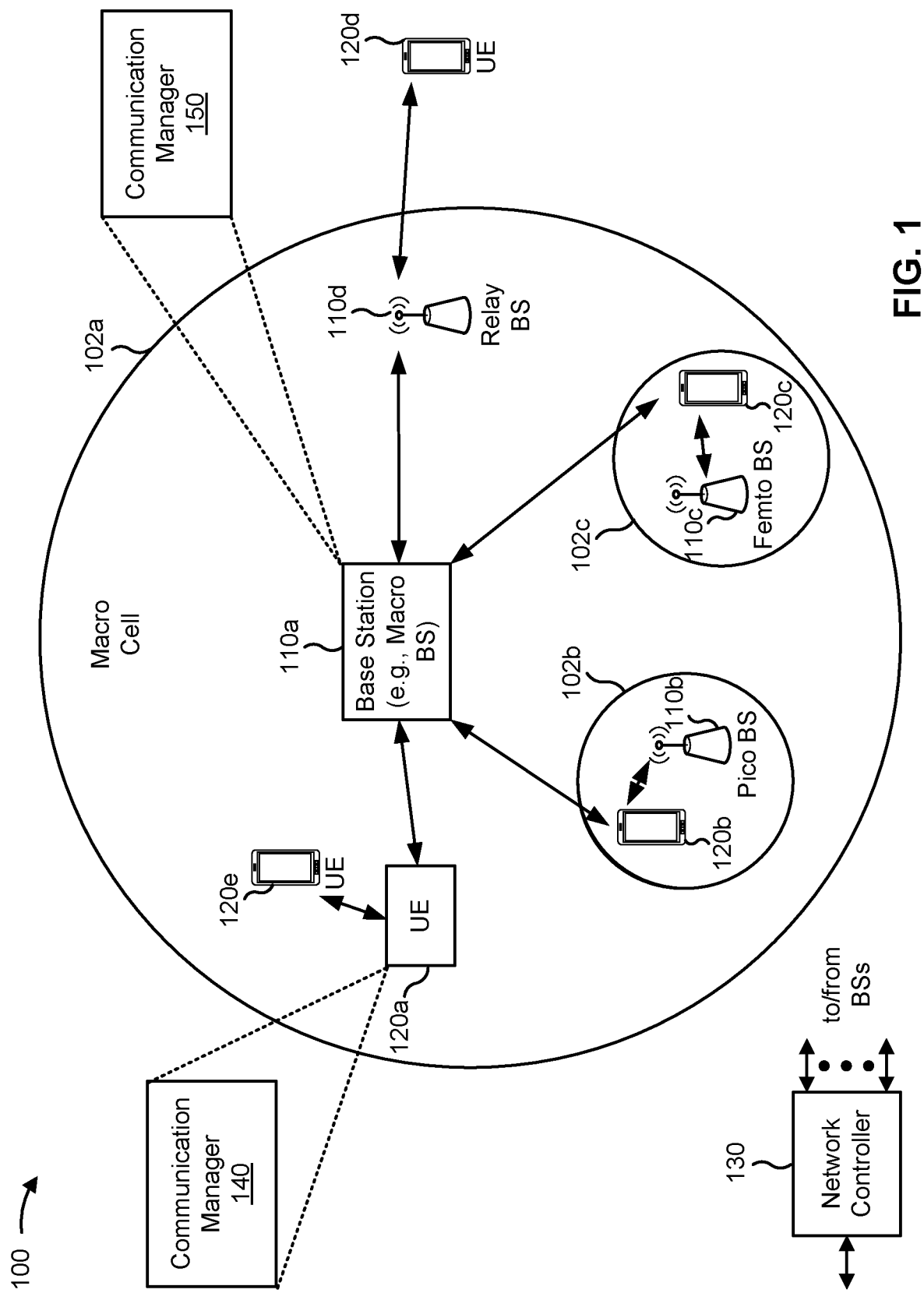
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a network node (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the base station 110) may include a communication manager 150. As described in more detail elsewhere herein, the communication manager 150 may obtain an erroneous packet from a first communication device; and output an indication of bit error rate (BER) information, based on the erroneous packet, to a second communication device to facilitate error mitigation at the second communication device. Additionally, or alternatively, the communication manager 150 may perform one or more other operations described herein.

In some aspects, the first communication device may include a communication manager 140. As described in more detail elsewhere herein, the communication manager 140 may obtain one or more voice communications from a communication device; determine BER information associated with the one or more voice communications; obtain a plurality of voice packets from the communication device;

decode, based at least in part on the BER information, at least a portion of at least one voice packet of the plurality of voice packets to generate at least one partially decoded voice packet; and generate voice data using the at least one partially decoded voice packet. Additionally, or alternatively, the communication manager 140 may perform one or more other operations described herein.

As indicated above, FIG. 1 is provided as an example. Other examples may differ from what is described with regard to FIG. 1.

Figure 2:
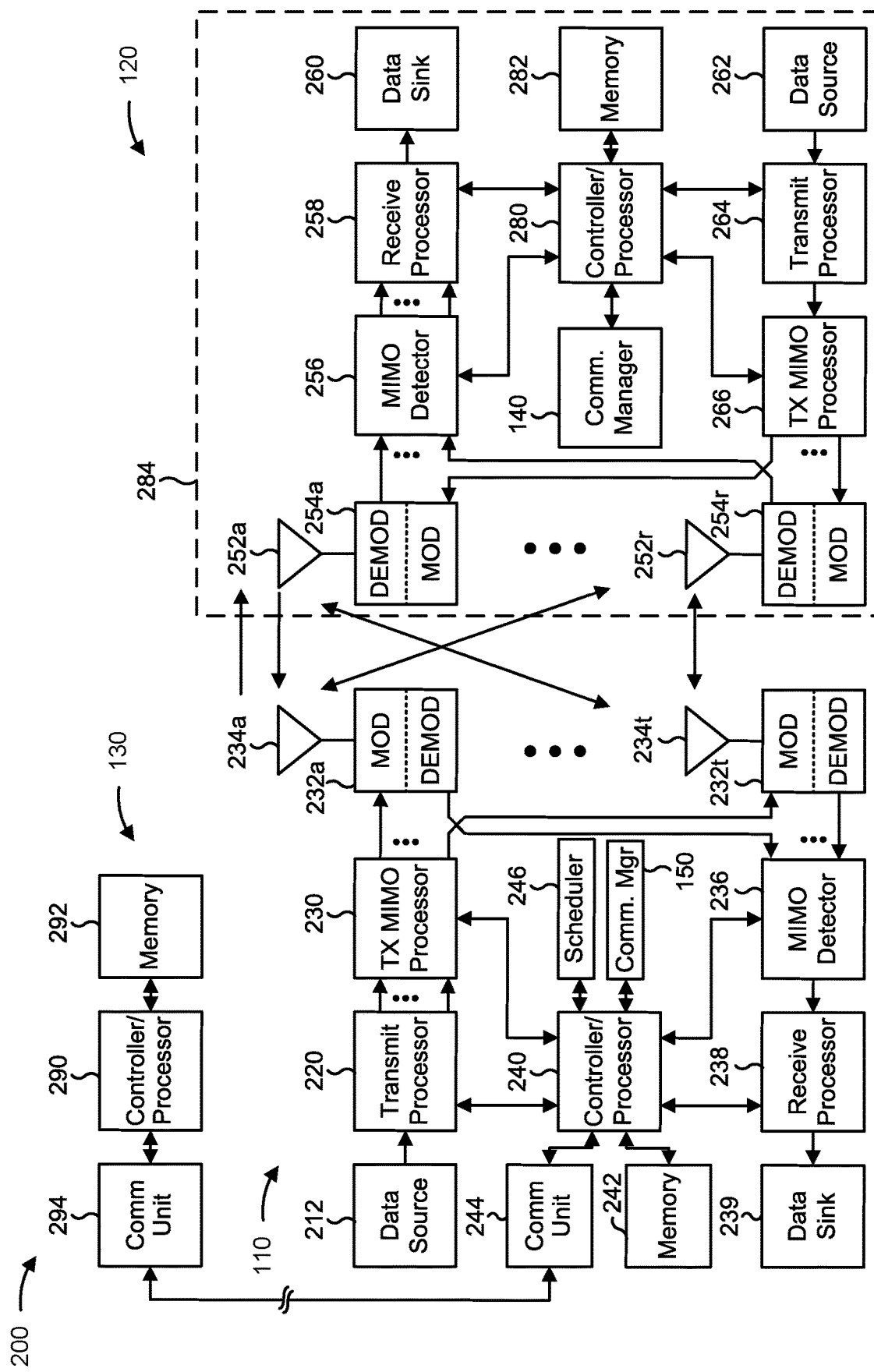
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with using partially decoded packets for error mitigation at a voice decoder, as described in more detail elsewhere herein. In some aspects, the communication device described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the network node includes means for obtaining an erroneous packet from a first communication device (e.g., the communication manager 150, the modem 232, the antenna 234, the MIMO detector 236, the receive processor 238, the controller/processor 240, and/or the memory 242); and/or means for outputting an indication of bit error rate (BER) information, based on the erroneous packet, to a second communication device to facilitate error mitigation at the second communication device (e.g., the communication manager 150, transmit processor 220, TX MIMO processor 230, the modem 232, the antenna 234, the controller/processor 240, and/or the memory 242).

In some aspects, the network node includes means for determining a plurality of BER distributions, wherein each BER distribution of the plurality of BER distributions is associated with at least one block error rate, wherein the BER information is based on the plurality of BER distributions (e.g., the communication manager 150, the controller/processor 240, and/or the memory 242). In some aspects, the network node includes means for performing at least one of: a simulation or a training operation using voice training data (e.g., communication manager 150, transmit processor 220, TX MIMO processor 230, modem 232, antenna 234, MIMO detector 236, receive processor 238, controller/processor 240, memory 242, or scheduler 246).

In some aspects, the network node includes means for obtaining, from the second communication device, two or more repetitions of an encoded message, wherein the two or more repetitions of the encoded message comprise the erroneous packet (e.g., the communication manager 150, the modem 232, the antenna 234, the MIMO detector 236, the receive processor 238, the controller/processor 240, and/or the memory 242); decoding, using joint processing, the two or more repetitions to determine the encoded message (e.g., the communication manager 150, the modem 232, the antenna 234, the MIMO detector 236, the receive processor 238, the controller/processor 240, and/or the memory 242); individually decoding each repetition of the two or more repetitions (e.g., the communication manager 150, the modem 232, the antenna 234, the MIMO detector 236, the receive processor 238, the controller/processor 240, and/or the memory 242); and recording a decoding indication associated with each repetition to generate a BER profile of a set of BER profiles (e.g., the communication manager 150, the controller/processor 240, and/or the memory 242).

In some aspects, the network node includes means for generating a random sequence seed (e.g., the communication manager 150, the controller/processor 240, and/or the memory 242); encoding the random sequence seed to generate an encoded random sequence seed (e.g., the communication manager 150, transmit processor 220, TX MIMO processor 230, the modem 232, the antenna 234, the controller/processor 240, and/or the memory 242); outputting for transmission the encoded random sequence seed to the second communication device (e.g., the communication manager 150, transmit processor 220, TX MIMO processor 230, the modem 232, the antenna 234, the controller/processor 240, and/or the memory 242); obtaining, from the second communication device, an encoded sequence corresponding to the random sequence seed, wherein the encoded sequence comprises the erroneous packet (e.g., the communication manager 150, the modem 232, the antenna 234, the MIMO detector 236, the receive processor 238, the controller/processor 240, and/or the memory 242); generating a network-generated sequence using the random sequence seed (e.g., the communication manager 150, transmit processor 220, TX MIMO processor 230, the modem 232, the antenna 234, the controller/processor 240, and/or the memory 242); decoding the encoded sequence to generate a decoded sequence (e.g., the communication manager 150, the modem 232, the antenna 234, the MIMO detector 236, the receive processor 238, the controller/processor 240, and/or the memory 242); and determining a BER value based on a comparison between the network-generated sequence and the decoded sequence, wherein the BER information is based on the BER value (e.g., the communication manager 150, the modem 232, the antenna 234, the MIMO detector 236, the receive processor 238, the controller/processor 240, and/or the memory 242).

In some aspects, the network node includes means for generating a binary sequence (e.g., the communication manager 150, transmit processor 220, the controller/processor 240, and/or the memory 242); encoding the binary sequence to generate an encoded binary sequence (e.g., the communication manager 150, transmit processor 220, TX MIMO processor 230, the modem 232, the antenna 234, the controller/processor 240, and/or the memory 242); outputting for transmission the encoded binary sequence to the second communication device (e.g., the communication manager 150, transmit processor 220, TX MIMO processor 230, the modem 232, the antenna 234, the controller/processor 240, and/or the memory 242); obtaining, from the second communication device, an encoded sequence corresponding to the binary sequence, wherein the encoded sequence comprises the erroneous packet (e.g., the communication manager 150, the modem 232, the antenna 234, the MIMO detector 236, the receive processor 238, the controller/processor 240, and/or the memory 242); decoding the encoded sequence to generate a decoded sequence (e.g., the communication manager 150, the modem 232, the antenna 234, the MIMO detector 236, the receive processor 238, the controller/processor 240, and/or the memory 242); and determining a BER value based on a comparison between the binary sequence and the decoded sequence, wherein the BER information is based on the BER value (e.g., the communication manager 150, the controller/processor 240, and/or the memory 242).

In some aspects, the network node includes means for selecting a BER profile of a set of BER profiles (e.g., the communication manager 150, the controller/processor 240, and/or the memory 242). In some aspects, the network node includes means for determining, using a signal to noise-plus-interference ratio to block error rate (BLER) mapping, a BLER range associated with a transport block (e.g., the communication manager 150, the modem 232, the antenna 234, the MIMO detector 236, the receive processor 238, the controller/processor 240, and/or the memory 242).

In some aspects, the network node includes means for determining an estimated BER for the erroneous packet based at least in part on at least one of an intermediate decoding result associated with the erroneous packet or a final decoding result associated with the erroneous packet (e.g., the communication manager 150, the modem 232, the antenna 234, the MIMO detector 236, the receive processor 238, the controller/processor 240, and/or the memory 242); and outputting for transmission an indication of the estimated BER (e.g., the communication manager 150, transmit processor 220, TX MIMO processor 230, the modem 232, the antenna 234, the controller/processor 240, and/or the memory 242).

In some aspects, the network node includes means for determining a plurality of information bits corresponding to the erroneous packet (e.g., the communication manager 150, the modem 232, the antenna 234, the MIMO detector 236, the receive processor 238, the controller/processor 240, and/or the memory 242); determining a number of unreliable bits of the plurality of information bits (e.g., the communication manager 150, the modem 232, the antenna 234, the MIMO detector 236, the receive processor 238, the controller/processor 240, and/or the memory 242); and determining the estimated BER based on at least one of the number of unreliable bits, a probability of a bit being wrongly decoded, or a number of information bits of the plurality of information bits (e.g., the communication manager 150, the controller/processor 240, and/or the memory 242).

In some aspects, the network node includes means for obtaining a voice packet (e.g., the communication manager 150, the modem 232, the antenna 234, the MIMO detector 236, the receive processor 238, the controller/processor 240, and/or the memory 242); and classifying the voice packet based at least in part on a decoding result associated with the voice packet (e.g., the communication manager 150, the controller/processor 240, and/or the memory 242).

In some aspects, the network node includes means for determining that a transport block of the voice packet includes an inconsistent cyclic redundancy check (CRC) corresponding to one or more bits of a specified class (e.g., the communication manager 150, the modem 232, the antenna 234, the MIMO detector 236, the receive processor 238, the controller/processor 240, and/or the memory 242); and dropping the transport block based at least in part on determining that the transport block of the voice packet includes the inconsistent CRC corresponding to the one or more bits of the specified class (e.g., the communication manager 150, the modem 232, the antenna 234, the MIMO detector 236, the receive processor 238, the controller/processor 240, and/or the memory 242).

In some aspects, the network node includes means for generating a real-time transport (RTP) packet corresponding to the voice packet (e.g., the communication manager 150, transmit processor 220, TX MIMO processor 230, the modem 232, the controller/processor 240, and/or the memory 242); and encapsulating the RTP packet into an internet protocol (IP) packet that indicates an IP address of the second communication device as a source IP address (e.g., the communication manager 150, transmit processor 220, TX MIMO processor 230, the modem 232, the controller/processor 240, and/or the memory 242).

In some aspects, the network node includes means for decompressing a Robust Header Compression header associated with the voice packet (e.g., the communication manager 150, the modem 232, the MIMO detector 236, the receive processor 238, the controller/processor 240, and/or the memory 242); determining that a voice packet type of the voice packet is a partially correct type (e.g., the communication manager 150, the controller/processor 240, and/or the memory 242); updating an IP check sum based on an IP payload of the voice packet based at least in part on determining that the voice packet type is a partially correct type (e.g., the communication manager 150, the receive processor 238, the controller/processor 240, and/or the memory 242); and outputting for transmission the voice packet, including the updated IP check sum, to the second communication device (e.g., the communication manager 150, transmit processor 220, TX MIMO processor 230, the modem 232, the antenna 234, the controller/processor 240, and/or the memory 242). In some aspects, the network node includes means for outputting for transmission an indication of a voice packet type of the voice packet (e.g., the communication manager 150, transmit processor 220, TX MIMO processor 230, the modem 232, the antenna 234, the controller/processor 240, and/or the memory 242).

In some aspects, an apparatus (e.g., a communication device) includes means for obtaining one or more voice communications from a communication device (communication manager 140, antenna 252, modem 254, MIMO detector 256, receive processor 258, controller/processor 280, or memory 282); determining BER information associated with the one or more voice communications (communication manager 140, MIMO detector 256, receive processor 258, controller/processor 280, or memory 282); obtaining a plurality of voice packets from the communication device (communication manager 140, antenna 252, modem 254, MIMO detector 256, receive processor 258, controller/processor 280, or memory 282); decoding, based at least in part on the BER information, at least a portion of at least one voice packet of the plurality of voice packets to generate at least one partially decoded voice packet (communication manager 140, modem 254, MIMO detector 256, receive processor 258, controller/processor 280, or memory 282); and generating voice data using the at least one partially decoded voice packet (communication manager 140, receive processor 258, controller/processor 280, or memory 282).

In some aspects, the apparatus includes means for receiving an indication of the BER information (communication manager 140, antenna 252, modem 254, MIMO detector 256, receive processor 258, controller/processor 280, or memory 282). In some aspects, the apparatus includes means for selecting a BER profile of the set of BER profiles (communication manager 140, controller/processor 280, or memory 282); and generating the voice data based on the selected BER profile (communication manager 140, MIMO detector 256, receive processor 258, controller/processor 280, or memory 282).

In some aspects, the apparatus includes means for determining that a physical layer decoding of a voice packet of the plurality of voice packets is incorrect (communication manager 140, MIMO detector 256, receive processor 258, controller/processor 280, or memory 282); determining an updated BER profile based at least in part on determining that the physical layer decoding of the voice packet of the plurality of voice packets is incorrect (communication manager 140, controller/processor 280, or memory 282); and generating the voice data based on the updated BER profile (communication manager 140, receive processor 258, controller/processor 280, or memory 282). In some aspects, the apparatus includes means for determining a moving average of a plurality of block error rate (BLER) measurements (communication manager 140, antenna 252, modem 254, MIMO detector 256, receive processor 258, controller/processor 280, or memory 282).

In some aspects, the apparatus includes means for determining that a BLER at the apparatus satisfies a threshold (communication manager 140, controller/processor 280, or memory 282). In some aspects, the apparatus includes means for classifying the at least one voice packet based at least in part on a decoding result associated with the at least one voice packet (communication manager 140, controller/processor 280, or memory 282).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more distributed units (DUs), or one or more radio units (RUS)). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
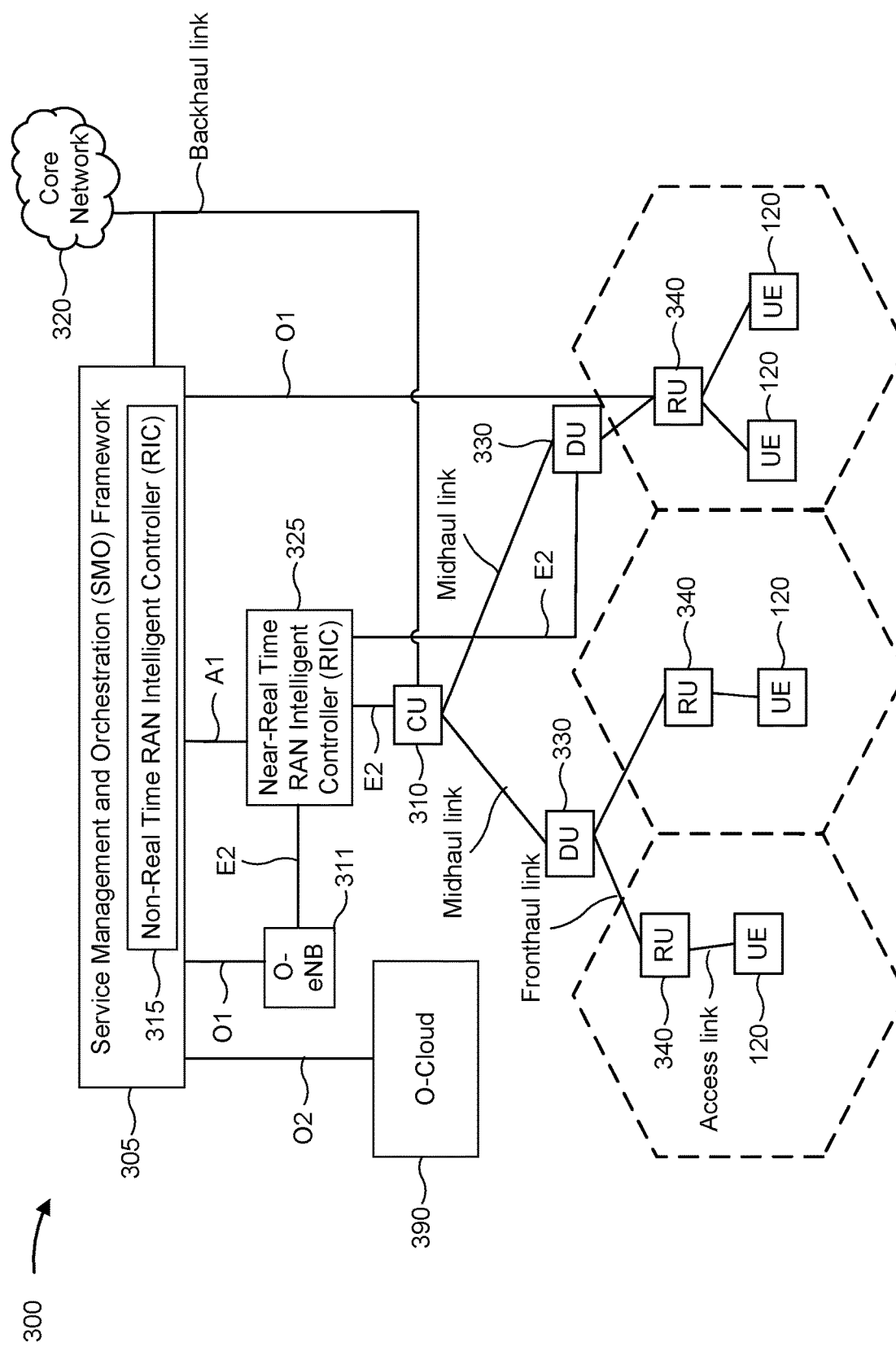
FIG. 3 is a diagram illustrating a disaggregated base station, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near Real Time (Near-RT) RAN integrated controller (RIC) 325 via an E2 link, or a Non Real Time (Non-RT) RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
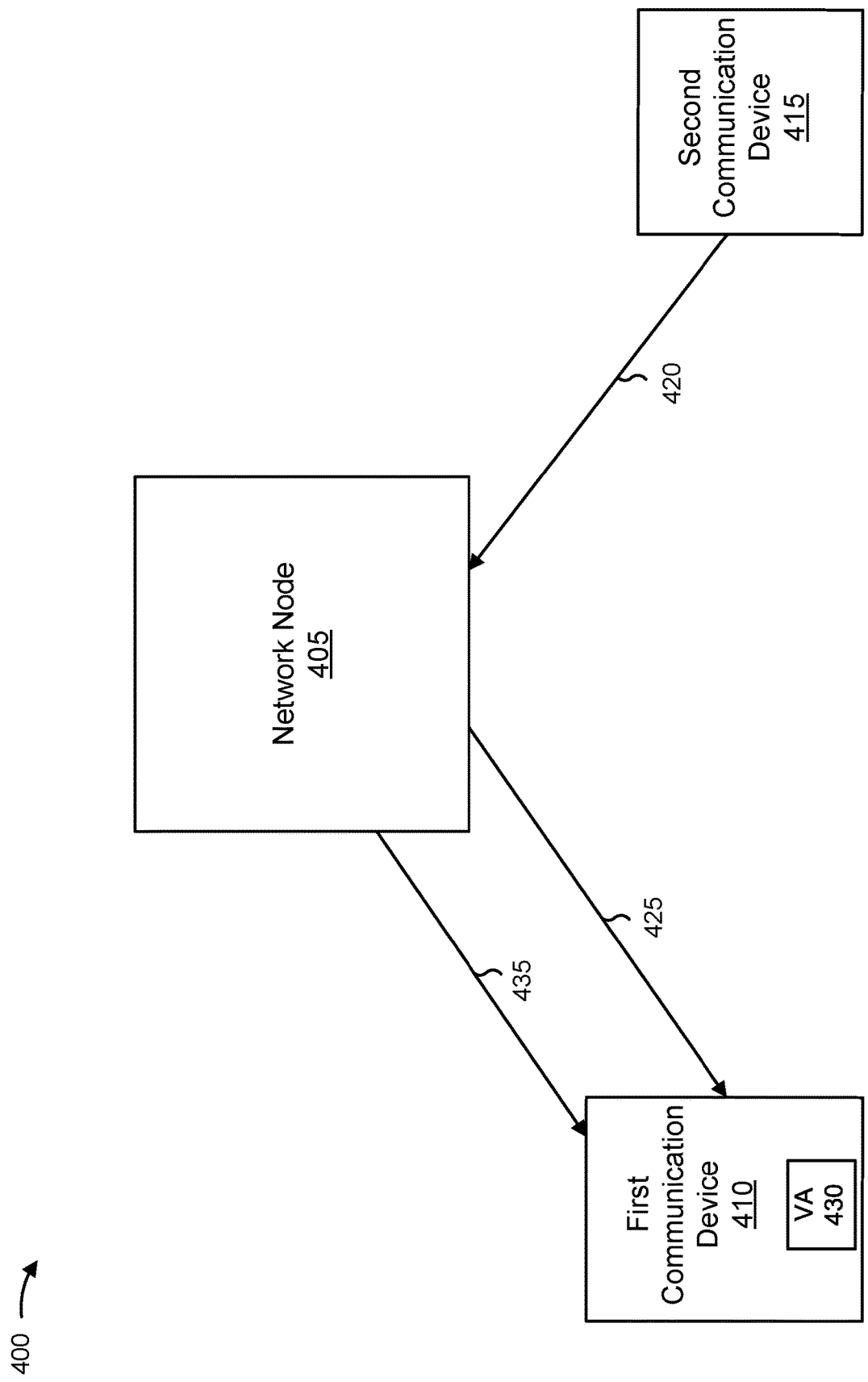
FIG. 4 is a diagram illustrating an example of wireless voice communication, in accordance with the present disclosure.

FIG. 4 is a diagram illustrating an example 400 associated with wireless voice communications, in accordance with the present disclosure. As shown in FIG. 4, a network node 405 may communicate with a first communication device 410 and a second communication device 415. The network node 405 may be configured to facilitate voice communications between the two communication devices 410 and 415. The communication devices 410 and/or 415 may include a UE (e.g., a smartphone or a vehicle) and/or a WiFi-connected device (e.g., a computer, a laptop, or a gaming console), among other examples. For example, in some aspects, the first communication device 410 and/or the second communication device 415 may be, be similar to, include, or be included in the UE 120 shown in FIGS. 1 and 2. In some aspects, the network node 405 may be, be similar to, include, or be included in the base station 110 shown in FIGS. 1 and 2.

As shown by reference number 420, the second communication device 415 may transmit a voice communication to the network node 405 for delivery to the first communication device 410. The voice communication may include a number of data packets. As shown by reference number 425, the network node may transmit the voice communication to the first communication device 410. A voice application (shown as "VA") 430 may attempt to decode the packets of the voice communication. In some cases, one or more of the packets can be erroneous and/or may not be able to be accurately decoded. The voice application 430 can discard the entire communication based on detection of one or more erroneous packets and/or a determination that one or more packets could not be accurately decoded. In this way, receipt of erroneous packets can result in retransmissions and/or failure of communications, thereby having a negative impact on device and/or network performance.

The incidence of erroneous packets can be greater in an NTN implementation. For example, the coverage in the uplink may be poor, due to the large distance, limited UE transmit power, polarization mismatch loss (e.g., where the UE is linearly polarized, but the satellite is circularly polarized), and/or antenna loss. The BLER in an NTN voice communication may be high (e.g., 10%). However, if the erroneous packets are still useful to the voice coder/decoder ("codec"), then the quality of the decoded voice communication may be improved. In some cases, for example, a low density parity check (LDPC) code, which is a systemic code in NR, may be used. By using LDPC, even if a CRC fails, the systematic portion of the received codeword may still carry info about the payload. For example, the received systematic bits may be close to the payload in Hamming distance. The resulting partially decoded packet may be useful for error mitigation at the voice decoder.

Some techniques and apparatuses described herein may facilitate the use of partially decoded packets for error mitigation. For example, because a BER in an erroneous packet may be small (e.g., less than 30% for 90% of erroneous packets for all profiles), voice codecs (which may be, or be included in, voice applications) may leverage partially decoded erroneous packets to facilitate generation of a voice signal from a plurality of packets. In some aspects, a network node may determine BER information associated with reception, by a first communication device, of voice communications from a second communication device. As shown by reference number 435, the network node may transmit an indication of the BER information to a voice application receiver associated with the first communication device to facilitate error mitigation at the first communication device based on partially decoded voice packets. In this way, some aspects may facilitate using more of the packets that are transmitted, which may improve efficiency and voice quality, thereby having positive impacts on device and/or network performance.

As indicated above, FIG. 4 is provided as an example. Other examples may differ from what is described with respect to FIG. 4. In some aspects, for example, adaptive multi-rate (AMR) codecs may define bit classes (A, B, and C), with decreasing levels of sensitivity to errors. For example, an AMR frame with errors in Class A bits may be dropped at the voice decoder, while an AMR frame with errors in Class B bits or Class C bits may be accepted by the voice decoder (e.g., for error mitigation). Errors in Class A can be detected by using the CRC bits associated with Class A bits. A frame quality indicator indicates whether the data in the frame contains errors. These characteristics of the AMR codec may be utilized in techniques described herein to facilitate using partially decoded packets for error mitigation.

Figure 5:
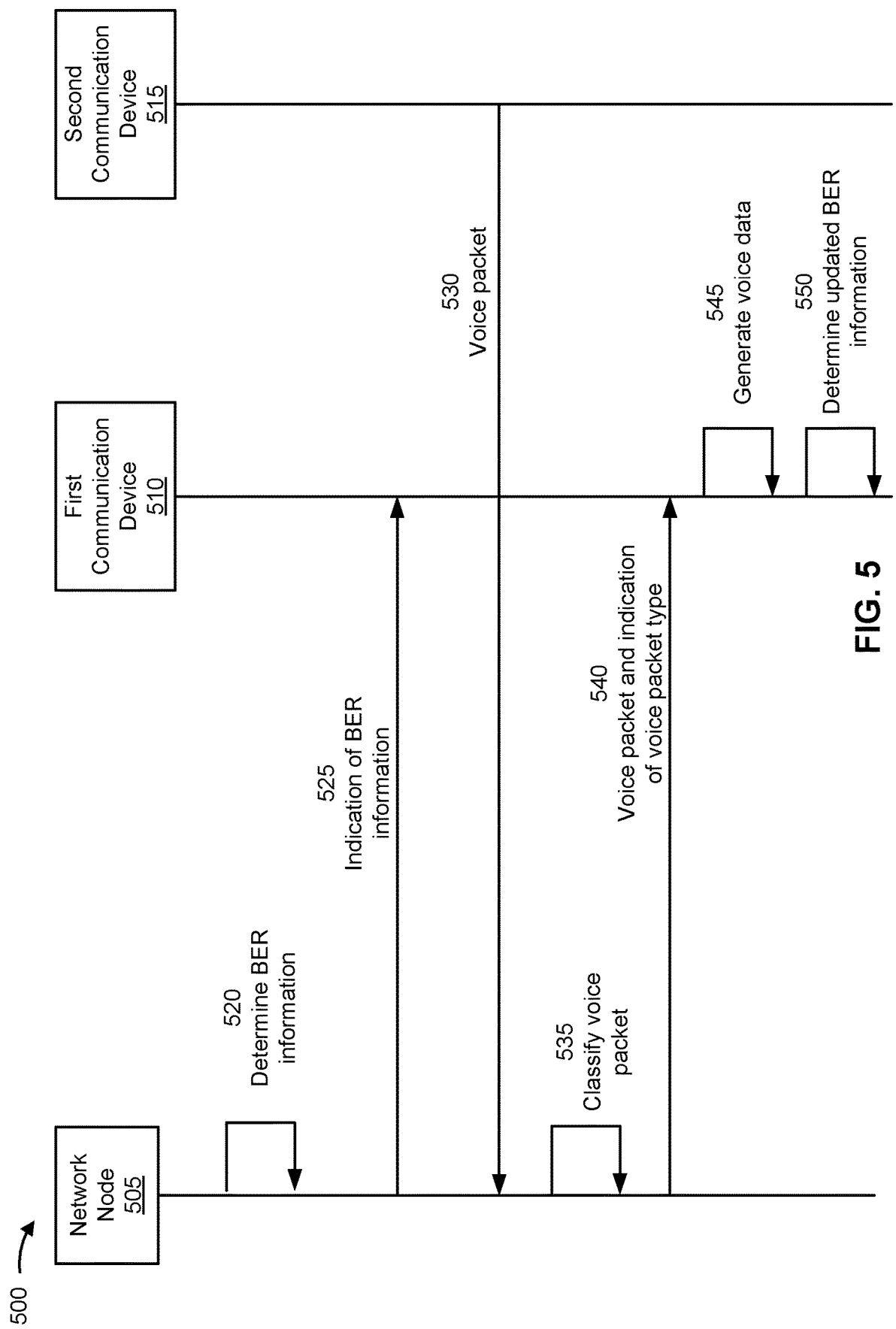
FIG. 5 is a diagram illustrating an example associated with using partially decoded packets for error mitigation at a voice decoder, in accordance with the present disclosure.

FIG. 5 is a diagram illustrating an example 500 associated with using partially decoded packets for error mitigation at a voice decoder, in accordance with the present disclosure. As shown in FIG. 5, a network node 505 may communicate with a first communication device 510 and a second communication device 515. The network node 505 may be configured to facilitate voice communications between the two communication devices 510 and 515. The communication devices 510 and/or 515 may be, or be similar to, the communication devices 410 and 415, shown in FIG. 4.

As shown by reference number 520, the network node 505 may determine BER information associated with reception, by the first communication device 510, of voice communications from the second communication device 515. In some aspects, the BER information may include a set of BER profiles. A BER profile of the set of BER profiles may indicate a fraction of transport blocks within each of a plurality of BER ranges. For example, each row of Table 1, below, is an example of a BER profile. Each cell of a profile may indicate a BER distribution, based on a cumulative distribution function (CDF) for the given profile, which may correspond to a BLER.

TABLE 1

| Profile | BER distribution | | | | |
|---|---|---|---|---|---|
| | 0 | (0, 0.1] | (0.1, 0.2] | (0.2, 0.4] | (0.4, 0.5] |
| BLER 20% profile | 0.7935 | 0.0426 | 0.0845 | 0.0790 | 0.0004 |
| BLER 15% profile | 0.8510 | 0.0274 | 0.0610 | 0.0606 | 0 |
| BLER 10% profile | 0.8930 | 0.0214 | 0.0429 | 0.0426 | 0 |
| BLER 5% profile | 0.9510 | 0.0125 | 0.0165 | 0.0200 | 0 |

In some aspects, the network node 505 may determine the BER information by determining the set of BER profiles. As indicated above, determining the set of BER profiles may include determining a plurality of BER distributions, where each BER distribution of the plurality of BER distributions is associated with at least one BLER.

In some aspects, the network node 505 may determine the set of BER profiles by performing a simulation. The network node 505 may include a simulator, for example, that performs encoding, modulation, channel modeling, and decoding, and records the BLER for a simulation setup and the resulting BER distribution, thereby generating a row of a table such as Table 1, above. In some aspects, the network node 505 may perform the simulation offline (e.g., with a channel model from spec, or from an empirical measurement) and may upload the BER information to the network. In some aspects, the BER information may be stored on the Internet and retrieved by the network. Performing the simulation offline may include performing the simulation offline while the network node 505 is not in an operation mode.

In some aspects, the network node may perform the simulation in the network ("online"). The channel model may be indicated by a specification and/or obtained by a measurement associated with the channel. In some aspects, performing the simulation on the network may include performing the simulation online while the network node 505 is in an operation mode. Different simulation setups may be used to generate different target BLER values and/or ranges.

In some aspects, the network node 505 may determine the set of BER profiles by performing a training operation using voice training data. The BER distribution at each BLER level may be obtained via a training phase. In some aspects, for example, the training phase may be done only once for all UEs. In some aspects, the training phase may be performed during online and/or offline operation.

In some aspects, the network node 505 and the first communication device 510 may perform a training operation. For example, in some aspects, the first communication device 510 may transmit, and the network node 505 may receive, two or more repetitions of an encoded message. The network node 505 may decode, using joint processing, the two or more repetitions to determine the encoded message. The network node 505 may individually decode each repetition of the two or more repetitions and compare the individually decoded message with the jointly decoded message. The network node 505 may record a decoding indication associated with each repetition to generate a BER profile of the set of BER profiles.

In some aspects, the network node 505 and the second communication device 515 may perform a training operation using a random or pseudo-random sequence. For example, in some aspects, the network node 505 may generate a random sequence seed and encode the random sequence seed to generate an encoded random sequence seed. The network node 505 may transmit, and the second communication device 515 may receive, the encoded random sequence seed. The second communication device 515 may generate a sequence using the random sequence seed and may encode the sequence to generate an encoded sequence. The sequence may be a random sequence or a pseudo-random sequence. The second communication device 515 may transmit, and the network node 505 may receive, the encoded sequence corresponding to the random sequence seed. The network node 505 may generate a network-generated sequence using the random sequence seed. The network node 505 may decode the encoded sequence to generate a decoded sequence and may compare the network-generated sequence with the decoded sequence to determine a BER value.

In some aspects, the network node 505 and the second communication device 515 may perform a training operation using an exchanged binary sequence. For example, in some aspects, the network node 505 may generate a binary sequence and encode the binary sequence to generate an encoded binary sequence. The network node 505 may transmit, and the second communication device 515 may receive, the encoded binary sequence. The second communication device 515 may decode the encoded binary sequence to generate a sequence and may encode the sequence to generate an encoded sequence corresponding to the binary sequence. The second communication device 515 may transmit, and the network node 505 may receive, the encoded sequence corresponding to the binary sequence. The network node 505 may decode the encoded sequence to generate a decoded sequence and may compare the binary sequence with the decoded sequence to determine a BER value. The network node 505 may determine at least one additional BER value to generate the set of BER profiles.

In some aspects, the network node 505 may configure the second communication device 515 with a transmission power that may be selected to adjust a target BLER value and/or range. For example, in some aspects, the network node 505 may determine a transmission power configuration associated with a target BLER. The network node 505 may transmit, and the second communication device 515 may receive, the transmission power configuration. The second communication device 515 may implement the transmission power configuration. In some aspects, the network node 505 may determine the transmission power configuration based at least in part on a successful joint processing and decoding.

In some aspects, the network node 505 and/or the second communication device 515 may determine BER information by selecting a selected BER profile of the set of BER profiles. In some aspects, for example, the network node 505 may select a selected BER profile. The network node 505 may transmit, and the second communication device 515 may receive, an indication of the selected BER profile. For example, in some aspects, an indication of BER information may indicate the selected BER profile. In some aspects, the network node 505 and/or the second communication device 515 may select the selected BER profile based at least in part on a moving average of a plurality of BLER measurements.

In some aspects, the network node 505 and/or the second communication device 515 may use a signal-to-noise-plus-interference ratio to BLER mapping and/or a BLER range associated with a transport block, among other examples. For example, the network node 505 and/or the second communication device 515 may select the selected BER profile based at least in part on the BLER range.

In some aspects, the network node 505 may determine BER information based at least in part on a decoding result. For example, in some aspects, the network node 505 may receive an erroneous packet. The network node 505 may determine an estimated BER for the erroneous packet based at least in part on at least one of an intermediate decoding result associated with the erroneous packet or a final decoding result associated with the erroneous packet. In some aspects, the network node 505 may determine a plurality of information bits corresponding to the erroneous packet and may determine a number, U, of unreliable bits of the plurality of information bits. A bit may be considered unreliable (and hence the decoding on that bit may be incorrect) if the absolute value of the log likelihood ratio (LLR) for that bit fails to satisfy (e.g., is below) an LLR threshold. A bit may be considered reliable otherwise. The network node 505 may calculate a product of the number U of unreliable bits multiplied by a quotient of a probability, $\alpha$, divided by a total number, N, of information bits of the plurality of information bits. For example, the BER may be estimated as $U \times \alpha/N$, where a is the probability of a bit being wrongly decoded when the absolute value of the LLR is below the threshold. In some aspects, for example, $\alpha$ may take a value in [0, 0.5].

As shown by reference number 525, the network node 505 may transmit, and the second communication device 515 may receive, an indication of the BER information. In some aspects, the network node 505 may transmit the indication of the BER information to a voice application receiver associated with the second communication device 515 to facilitate error mitigation at the second communication device based on partially decoded voice packets. In some aspects, the network node 505 may transmit the indication of the BER information by transmitting a message that includes the indication. The message may include at least one of a session initiation protocol (SIP) message, a real-time transport control protocol (RTCP) message, or a real-time transport (RTP) message. In some aspects, the network node 505 may transmit the indication of the BER information by transmitting an indication of the estimated BER. For example, in some aspects, the network node 505 may transmit the indication of the estimated BER by transmitting at least one of an RTCP message, an RTP message, or an IP packet header.

As shown by reference number 530, the second communication device 515 may transmit, and the network node 505 may receive, a voice packet. As shown by reference number 535, the network node 505 may classify the voice packet based at least in part on decoding results associated with the voice packet. For example, in some aspects, the network node 505 may assign a fully correct type to the voice packet if the voice packet is successfully decoded or assign a partially correct type to the voice packet if the voice packet is not successfully decoded.

In some aspects, the network node 505 may determine that a transport block of the voice packet includes an inconsistent CRC corresponding to one or more bits of a specified class and may drop the transport block based at least in part on that determination. In some aspects, such as for circuit switching, the network node 505 may generate an RTP packet corresponding to the voice packet and encapsulate the RTP packet into an IP packet that indicates an IP address of the first communication device 510 as a source IP address. For packet switching, in some aspects, the network node 505 may decompress a Robust Header Compression (ROHC) header, determine that a voice packet type of the voice packet is a partially correct type, and recalculate an IP check sum based on an IP payload of the voice packet, based at least in part on determining that the voice packet type is a partially correct type.

As shown by reference number 540, the network node 505 may transmit, and the first communication device 510 may receive, the voice packet and an indication of a voice packet type of the voice packet. In some aspects, the network node 505 may transmit the indication of the voice packet type by transmitting an upper layer packet having a header that includes the indication. For example, the header may include an RTP header and the indication may include a value of at least one of a payload type field, a synchronization source identifier field, or a dedicated voice packet type field. In some aspects, the indication of the voice packet type may include a value of an IP option field. In some aspects, the indication of the voice packet type may include a user datagram protocol (UDP) source port number.

As shown by reference number 545, the first communication device 510 may generate voice data using, based at least in part on the BER information, at least one partially decoded voice packet of the plurality of voice packets. As shown by reference number 550, the first communication device 510 may determine that a physical layer decoding of a voice packet of the plurality of voice packets is incorrect and may determine an updated BER profile based at least in part on that determination. In some aspects, the network node 505 and/or the first communication device 510 may determine that the first communication device 510 is connected to a RAT that is different than an RAT associated with the set of BER profiles. The network node 505 and/or the first communication device 510 may determine an updated set of BER profiles based at least in part on determining that the first communication device 510 is connected to the RAT that is different than the RAT associated with the set of BER profiles.

In some aspects, the first communication device 510 may determine a moving average of a plurality of BLER measurements. In some aspects, the first communication device 510 may determine the updated BER profile based at least in part on the moving average of the BLER measurements. In some aspects, the first communication device 510 may determine an SINR-to-BLER mapping and may determine, based at least in part on the SINR-to-BLER mapping, a BLER range of a transport block associated with the voice packet. In some aspects, determining the updated BER profile may include determining the BLER range.

In some aspects, the first communication device 510 may determine that a BLER at the first communication device satisfies a threshold and may determine an updated BER profile by updating a BER profile as a function of a BLER at an originating network node and the BLER at the first communication device 510.

In some aspects, the first communication device 510 may receive a voice packet and classify the voice packet based at least in part on decoding results associated with the voice packet. In some aspects, the first communication device 510 may classify the voice packet by determining that a physical layer decoding of the voice packet is incorrect and assigning a partially correct type to the voice packet based at least in part on determining that the physical layer decoding of the voice packet is incorrect. In some aspects, the first communication device 510 may classify the voice packet by determining that a physical layer decoding of the voice packet is correct and refraining from updating a voice packet type of the voice packet based at least in part on determining that the physical layer decoding of the voice packet is correct.

In some aspects, the first communication device 510 may determine that a voice packet type of the voice packet is a partially correct type and may decode the voice packet using the BER information. In some aspects, determining that the voice packet type of the voice packet is a partially correct type comprises checking an error detection mechanism. For example, in some aspects, checking the error detection mechanism may include determining that the voice packet includes an AMR frame with a frame quality indicator having a value of zero.

As indicated above, FIG. 5 is provided as an example. Other examples may differ from what is described with respect to FIG. 5. For example, one or more operations such as determining the BER information may be performed by more than one network node 505 in a distributed manner.

Figure 6:
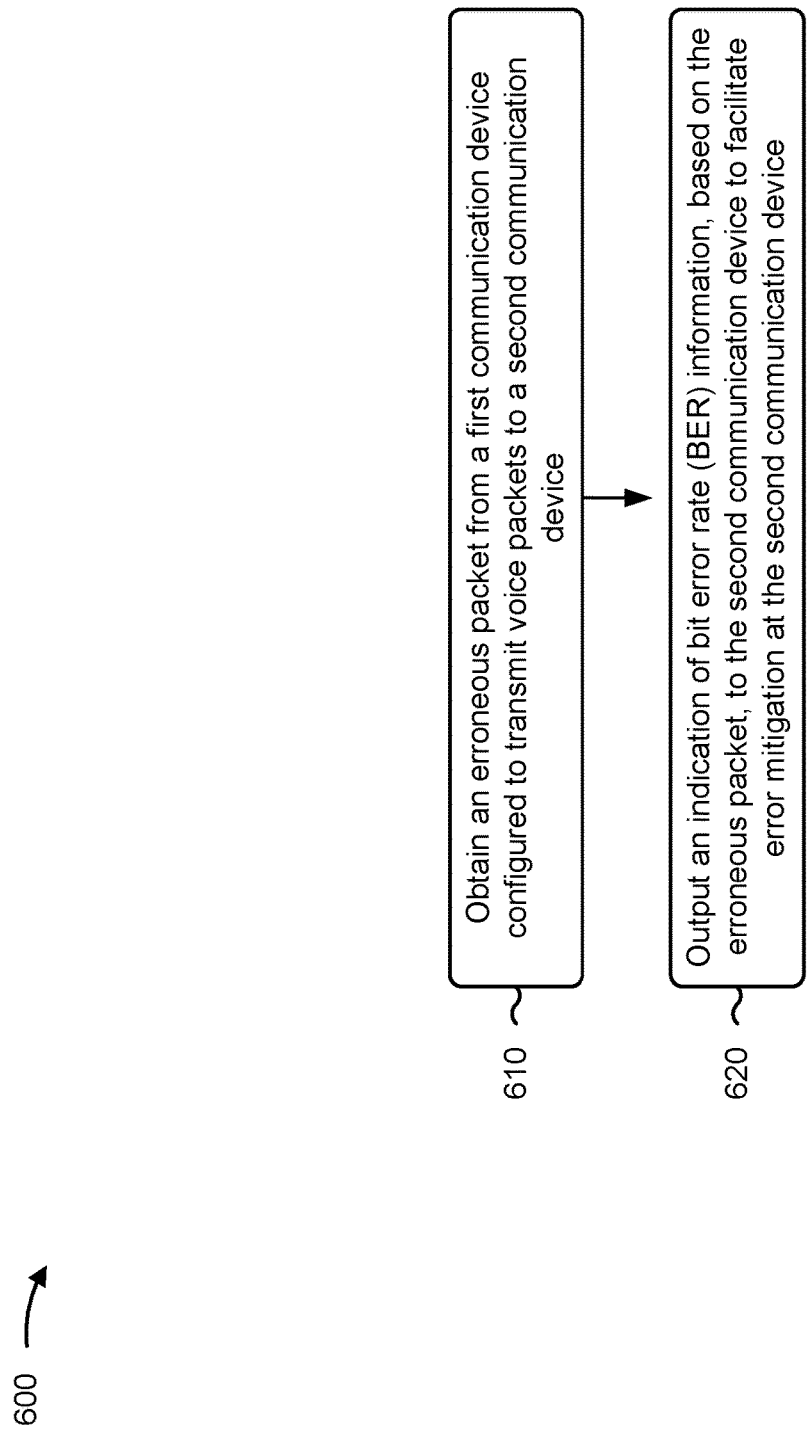
FIGS. 6 and 7 are diagrams illustrating example processes associated with using partially decoded packets for error mitigation at a voice decoder, in accordance with the present disclosure.

FIG. 6 is a diagram illustrating an example process 600 performed, for example, by an apparatus, in accordance with the present disclosure. Example process 600 is an example where the apparatus (e.g., base station 110, network node 405, and/or network node 505) performs operations associated with using partially decoded packets for error mitigation at a voice decoder.

As shown in FIG. 6, in some aspects, process 600 may include obtaining an erroneous packet from a first communication device (block 610). For example, the network node (e.g., using communication manager 808 and/or determination component 810, depicted in FIG. 8) may obtaining an erroneous packet from a first communication device, as described above.

As further shown in FIG. 6, in some aspects, process 600 may include outputting an indication of BER information, based on the erroneous packet, to a second communication device to facilitate error mitigation at the second communication device (block 620). For example, the network node (e.g., using communication manager 808 and/or transmission component 804, depicted in FIG. 8) may output an indication of BER information, based on the erroneous packet, to a second communication device to facilitate error mitigation at the first communication device, as described above.

Process 600 may include additional aspects, such as any single aspect or any combination of aspects described below and/or in connection with one or more other processes described elsewhere herein.

In a first aspect, the BER information comprises a set of BER profiles.

In a second aspect, alone or in combination with the first aspect, a BER profile of the set of BER profiles indicates a fraction of transport blocks within each of a plurality of BER ranges.

In a third aspect, alone or in combination with one or more of the first and second aspects, process 600 includes determining a plurality of BER distributions, wherein each BER distribution of the plurality of BER distributions is associated with at least one block error rate, wherein the BER information is based on the plurality of BER distributions.

In a fourth aspect, alone or in combination with one or more of the first through third aspects, process 600 includes performing at least one of a simulation or a training operation using voice training data.

In a fifth aspect, alone or in combination with the fourth aspect, performing the simulation comprises performing the simulation offline while the network node is not in an operation mode.

In a sixth aspect, alone or in combination with the fourth aspect, performing the simulation comprises performing the simulation online while the network node is in an operation mode.

In a seventh aspect, alone or in combination with one or more of the fifth or sixth aspects, performing the training operation comprises obtaining, from the second communication device, two or more repetitions of an encoded message, wherein the two or more repetitions of the encoded message comprise the erroneous packet, decoding, using joint processing, the two or more repetitions to determine the encoded message, individually decoding each repetition of the two or more repetitions, and recording a decoding indication associated with each repetition to generate a BER profile of a set of BER profiles.

In an eighth aspect, alone or in combination with the fifth aspect, performing the training operation comprises generating a random sequence seed, encoding the random sequence seed to generate an encoded random sequence seed, outputting for transmission the encoded random sequence seed to the second communication device, obtaining, from the second communication device, an encoded sequence corresponding to the random sequence seed, wherein the encoded sequence comprises the erroneous packet, generating a network-generated sequence using the random sequence seed, decoding the encoded sequence to generate a decoded sequence, and determining a BER value based on a comparison between the network-generated sequence and the decoded sequence, wherein the BER information is based on the BER value.

In a ninth aspect, alone or in combination with the fifth aspect, performing the training operation comprises generating a binary sequence, encoding the binary sequence to generate an encoded binary sequence, outputting for transmission the encoded binary sequence to the second communication device, obtaining, from the second communication device, an encoded sequence corresponding to the binary sequence, wherein the encoded sequence comprises the erroneous packet, decoding the encoded sequence to generate a decoded sequence, and determining a BER value based on a comparison between the binary sequence and the decoded sequence, wherein the BER information is based on the BER value.

In a tenth aspect, alone or in combination with one or more of the fifth through ninth aspects, process 600 includes determining a transmission power configuration associated with a target block error rate, and transmitting an indication of the transmission power configuration to the second communication device.

In an eleventh aspect, alone or in combination with one or more of the first through tenth aspects, process 600 includes selecting a BER profile of a set of BER profiles, and the BER information comprises the selected BER profile.

In a twelfth aspect, alone or in combination with the eleventh aspect, the BER profile is selected based at least in part on a moving average of a plurality of block error rate measurements.

In a thirteenth aspect, alone or in combination with one or more of the eleventh or twelfth aspects, process 600 includes determining, using an SINR-to-BLER mapping, a BLER range associated with a transport block, wherein the BER profile is selected based at least in part on the BLER range.

In a fourteenth aspect, alone or in combination with one or more of the first through thirteenth aspects, the indication of the BER information is output for transmission via a session initiation protocol message, a real-time transport control protocol message, or a real-time transport message.

In a fifteenth aspect, alone or in combination with one or more of the first through fourteenth aspects, process 600 includes determining an estimated BER for the erroneous packet based at least in part on at least one of an intermediate decoding result associated with the erroneous packet or a final decoding result associated with the erroneous packet, and outputting for transmission an indication of the estimated BER.

In a sixteenth aspect, alone or in combination with the fifteenth aspect, determining the estimated BER comprises determining a plurality of information bits corresponding to the erroneous packet, determining a number of unreliable bits of the plurality of information bits, and determining the estimated BER based on at least one of the number of unreliable bits, a probability of a bit being wrongly decoded, or a number of information bits of the plurality of information bits.

In a seventeenth aspect, alone or in combination with the sixteenth aspect, determining the number of unreliable bits comprises determining at least one unreliable bit by determining whether an absolute value of an LLR associated with the at least one bit fails to satisfy an LLR threshold.

In an eighteenth aspect, alone or in combination with the fifteenth aspect, outputting for transmission the indication of the estimated BER comprises outputting for transmission the indication of the estimated BER via an RTCP message, an RTP message, or an IP packet header.

In a nineteenth aspect, alone or in combination with one or more of the first through eighteenth aspects, process 600 includes obtaining a voice packet, and classifying the voice packet based at least in part on decoding results associated with the voice packet.

In a twentieth aspect, alone or in combination with the nineteenth aspect, the classification comprises an assignment of a fully correct classification type to the voice packet if the voice packet is successfully decoded, or assignment of a partially correct classification type to the voice packet if the voice packet is not successfully decoded.

In a twenty-first aspect, alone or in combination with one or more of the nineteenth through twentieth aspects, process 600 includes determining that a transport block of the voice packet includes an inconsistent CRC corresponding to one or more bits of a specified class, and dropping the transport block based at least in part on determining that the transport block of the voice packet includes the inconsistent CRC corresponding to the one or more bits of the specified class.

In a twenty-second aspect, alone or in combination with one or more of the twentieth through twenty-first aspects, process 600 includes generating an RTP packet corresponding to the voice packet, and encapsulating the RTP packet into an IP packet that indicates an IP address of the second communication device as a source IP address.

In a twenty-third aspect, alone or in combination with one or more of the twentieth through twenty-second aspects, process 600 includes decompressing a ROHC header, determining that a voice packet type of the voice packet is a partially correct type, updating an IP check sum based on an IP payload of the voice packet based at least in part on determining that the voice packet type is a partially correct type, and outputting for transmission the voice packet, including the updated IP check sum, to the second communication device.

In a twenty-fourth aspect, alone or in combination with one or more of the twentieth through twenty-third aspects, process 600 includes outputting for transmission an indication of a voice packet type of the voice packet.

In a twenty-fifth aspect, alone or in combination with the twenty-fourth aspect, outputting for transmission the indication of the voice packet type comprises outputting for transmission an upper layer packet having a header that includes the indication.

In a twenty-sixth aspect, alone or in combination with the twenty-fifth aspect, the header comprises a real-time protocol header, and the indication comprises a value of at least one of a payload type field, a synchronization source identifier field, or a dedicated voice packet type field.

In a twenty-seventh aspect, alone or in combination with one or more of the twenty-first through twenty-sixth aspects, the indication of the voice packet type comprises a value of an internet protocol option field.

In a twenty-eighth aspect, alone or in combination with one or more of the twenty-first through twenty-seventh aspects, the indication of the voice packet type comprises a user datagram protocol source port number.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
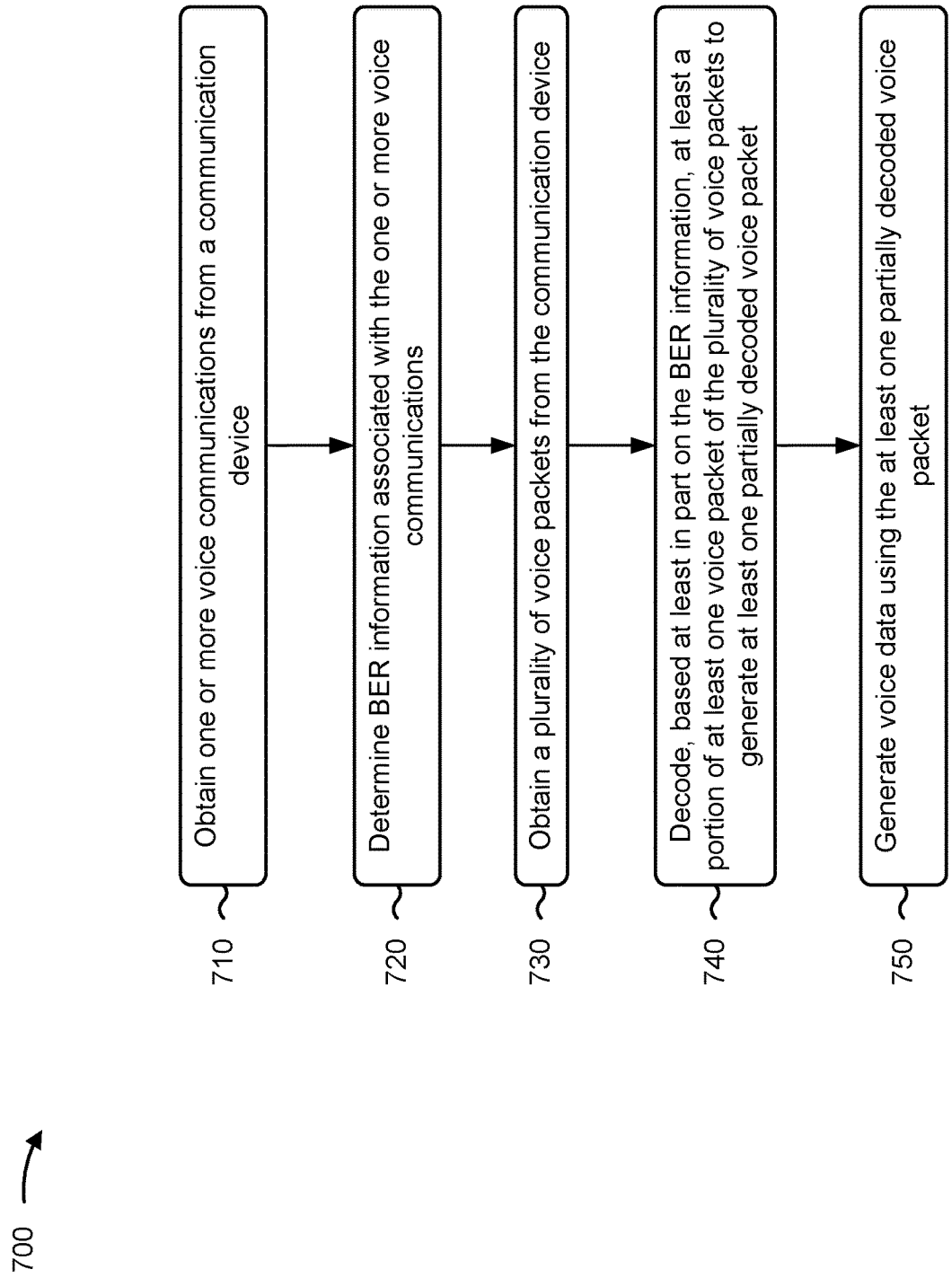

FIG. 7 is a diagram illustrating an example process 700 performed, for example, by an apparatus, in accordance with the present disclosure. Example process 700 is an example where the apparatus (e.g., UE 120, first communication device 410, and/or first communication device 510) performs operations associated with using partially decoded packets for error mitigation at a voice decoder.

As shown in FIG. 7, in some aspects, process 700 may include obtaining one or more voice communications from a communication device (block 710). For example, the apparatus (e.g., using communication manager 908 and/or reception component 902, depicted in FIG. 9) may obtain one or more voice communications from a communication device, as described above.

As shown in FIG. 7, in some aspects, process 700 may include determining BER information associated with the one or more voice communications (block 720). For example, the apparatus (e.g., using communication manager 908 and/or determination component 910, depicted in FIG. 9) may determine BER information associated with the one or more voice communications, as described above.

As shown in FIG. 7, in some aspects, process 700 may include decoding, based at least in part on the BER information, at least a portion of at least one voice packet of the plurality of voice packets to generate at least one partially decoded voice packet (block 730). For example, the apparatus (e.g., using communication manager 908 and/or reception component 902, depicted in FIG. 9) may decode, based at least in part on the BER information, at least a portion of at least one voice packet of the plurality of voice packets to generate at least one partially decoded voice packet, as described above.

As further shown in FIG. 7, in some aspects, process 700 may include obtaining a plurality of voice packets from the communication device (block 740). For example, the apparatus (e.g., using communication manager 908 and/or reception component 902, depicted in FIG. 9) may obtain a plurality of voice packets from the communication device, as described above.

As further shown in FIG. 7, in some aspects, process 700 may include generating voice data using the at least one partially decoded voice packet (block 750). For example, the first communication device (e.g., using communication manager 908 and/or generation component 912, depicted in FIG. 9) may generate voice data using the at least one partially decoded voice packet, as described above.

Process 700 may include additional aspects, such as any single aspect or any combination of aspects described below and/or in connection with one or more other processes described elsewhere herein.

In a first aspect, the determination includes receiving an indication of the BER information.

In a second aspect, alone or in combination with the first aspect, the BER information comprises a set of BER profiles.

In a third aspect, alone or in combination with the second aspect, a BER profile of the set of BER profiles indicates a fraction of transport blocks within each of a plurality of BER ranges.

In a fourth aspect, alone or in combination with one or more of the second through third aspects, the determination includes determining the set of BER profiles.

In a fifth aspect, alone or in combination with the fourth aspect, the determination includes determining a plurality of BER distributions, wherein each BER distribution of the plurality of BER distributions is associated with at least one block error rate.

In a sixth aspect, alone or in combination with one or more of the second through fifth aspects, determining the BER information further comprises determining a selected BER profile of the set of BER profiles.

In a seventh aspect, alone or in combination with the sixth aspect, determining the selected BER profile comprises receiving an indication of the selected BER profile.

In an eighth aspect, alone or in combination with one or more of the second through seventh aspects, process 700 includes determining that a physical layer decoding of a voice packet of the plurality of voice packets is incorrect, and determining an updated BER profile based at least in part on determining that the physical layer decoding of a voice packet of the plurality of voice packets is incorrect.

In a ninth aspect, alone or in combination with the eighth aspect, process 700 includes determining that the communication device is connected to an RAT that is different than an RAT associated with the set of BER profiles, and determining an updated set of BER profiles based at least in part on determining that the communication device is connected to the RAT that is different than the RAT associated with the set of BER profiles.

In a tenth aspect, alone or in combination with one or more of the eighth through ninth aspects, process 700 includes determining a moving average of a plurality of BLER measurements, wherein determining the updated BER profile comprises determining the updated BER profile based at least in part on the moving average of the BLER measurements.

In an eleventh aspect, alone or in combination with one or more of the eighth through tenth aspects, process 700 includes determining an SINR-to-BLER mapping, and determining, based at least in part on the SINR-to-BLER mapping, a BLER range of a transport block associated with the voice packet, wherein determining the updated BER profile comprises determining the BLER range.

In a twelfth aspect, alone or in combination with one or more of the eighth through eleventh aspects, process 700 includes determining that a BLER at the apparatus satisfies a threshold, and determining the updated BER profile based on at least one of a BLER at an originating network node or the BLER at the apparatus.

In a thirteenth aspect, alone or in combination with one or more of the first through twelfth aspects, determining the BER information comprises receiving a message that indicates the BER information, wherein the message comprises at least one of an SIP message, an RTCP message, or an RTP message.

In a fourteenth aspect, alone or in combination with one or more of the first through thirteenth aspects, determining the BER information comprises receiving an indication of an estimated BER.

In a fifteenth aspect, alone or in combination with the fourteenth aspect, receiving the indication of the estimated BER comprises receiving at least one of an RTCP message, an RTP message, or an IP packet header.

In a sixteenth aspect, alone or in combination with one or more of the first through fifteenth aspects, process 700 includes classifying the at least one voice packet based at least in part on a decoding result associated with the at least one voice packet.

In a seventeenth aspect, alone or in combination with the sixteenth aspect, classifying the at least one voice packet comprises determining that a physical layer decoding of the voice packet is incorrect, and assigning a partially correct type to the at least one voice packet based at least in part on determining that the physical layer decoding of the at least one voice packet is incorrect.

In an eighteenth aspect, alone or in combination with the sixteenth aspect, classifying the at least one voice packet comprises determining that a physical layer decoding of the at least one voice packet is correct, and refraining from updating a voice packet type of the at least one voice packet based at least in part on determining that the physical layer decoding of the at least one voice packet is correct.

In a nineteenth aspect, alone or in combination with one or more of the sixteenth through eighteenth aspects, process 700 includes determining that a voice packet type of the at least one voice packet is a partially correct type and decoding the at least one voice packet using the BER information.

In a twentieth aspect, alone or in combination with the nineteenth aspect, determining that the voice packet type of the at least one voice packet is a partially correct type comprises checking an error detection mechanism.

In a twenty-first aspect, alone or in combination with the twentieth aspect, checking the error detection mechanism comprises determining that the at least one voice packet includes an adaptive multi-rate frame with a frame quality indicator having a value of zero.

In a twenty-second aspect, alone or in combination with one or more of the nineteenth through twenty-first aspects, process 700 includes receiving an indication of the voice packet type of the at least one voice packet.

In a twenty-third aspect, alone or in combination with the twenty-second aspect, receiving the indication of the voice packet type comprises receiving an upper layer packet having a header that includes the indication.

In a twenty-fourth aspect, alone or in combination with the twenty-third aspect, the header comprises a real-time protocol header, and the indication comprises a value of at least one of a payload type field, a synchronization source identifier field, or a dedicated voice packet type field.

In a twenty-fifth aspect, alone or in combination with one or more of the twenty-third through twenty-fourth aspects, the indication of the voice packet type comprises a value of an IP option field.

In a twenty-sixth aspect, alone or in combination with one or more of the twenty-third through twenty-fifth aspects, the indication of the voice packet type comprises a UDP source port number.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
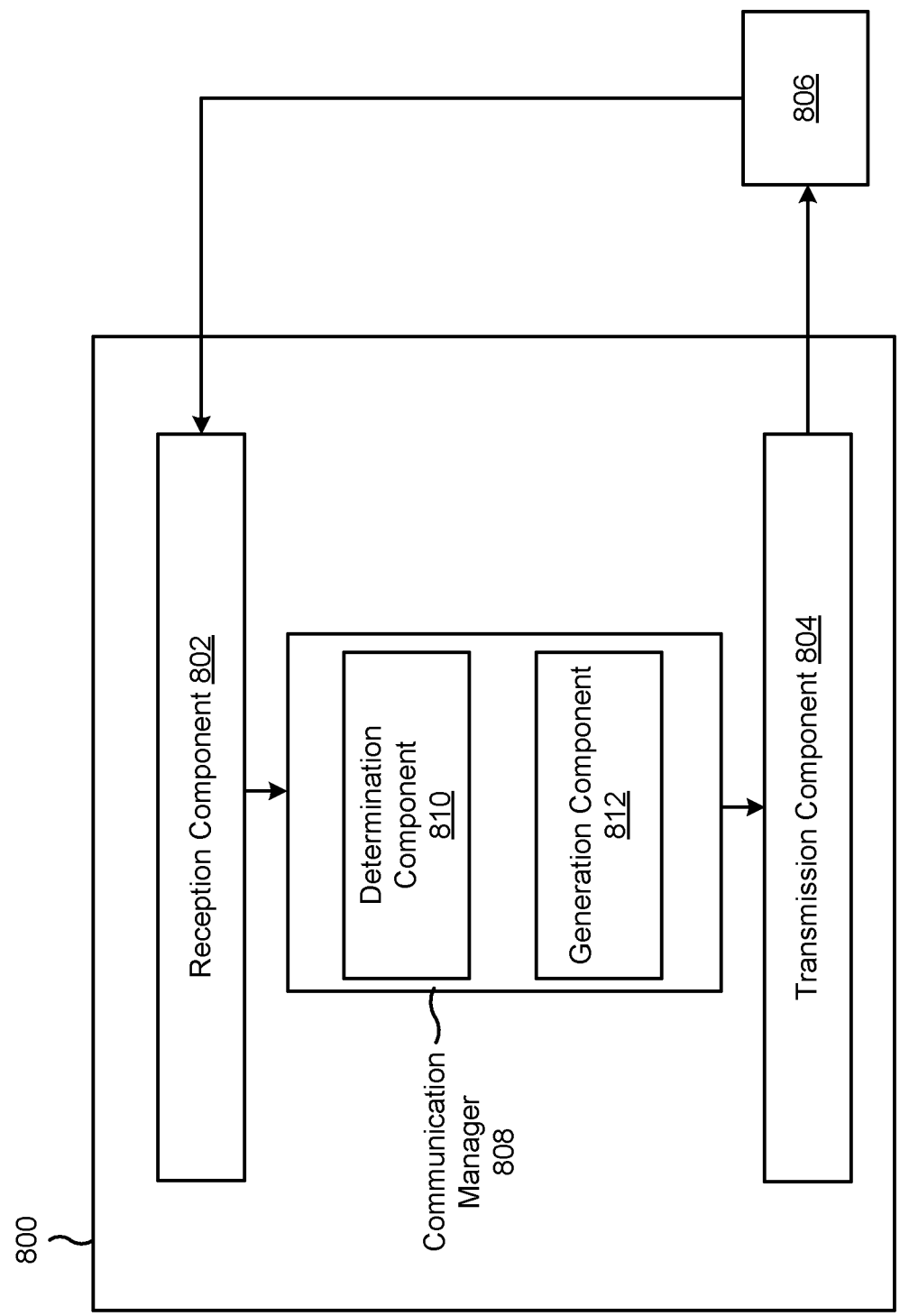
FIGS. 8 and 9 are diagrams of example apparatuses for wireless communication, in accordance with the present disclosure.

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another communication device) using the reception component 802 and the transmission component 804. As further shown, the apparatus 800 may include a communication manager 808. The communication manager 808 may be, or be similar to, the communication manager 150 shown in FIGS. 1 and 2. The communication manager 808 may include one or more of a determination component 810 or a generation component 812, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

The reception component 802 may obtain an erroneous packet from a first communication device. The transmission component 804 output an indication of BER information, based on the erroneous packet, to a second communication device to facilitate error mitigation at the second communication device. In some aspects, the communication manager 808 and/or the determination component 810 may include one or more antennas, a modem, a modulator, a transmit MIMO processor, a transmit processor, a controller/processor, a memory, or a combination thereof, of the base station described in connection with FIG. 2. In some aspects, the communication manager 808 and/or the determination component 810 may include the reception component 802 and/or the transmission component 804. The determination component 810 may determine at least one additional BER value to generate the set of BER profiles.

The determination component 810 may determine a transmission power configuration associated with a target BLER. The transmission component 804 may transmit an indication of the transmission power configuration to the second communication device. The determination component 810 may determine a plurality of BER distributions, wherein each BER distribution of the plurality of BER distributions is associated with at least one block error rate, wherein the BER information is based on the plurality of BER distributions. The communication manager 808, the reception component 802, and/or the transmission component 804 may perform at least one of: a simulation or a training operation using voice training data. The communication manager 808, the reception component 802, and/or the transmission component may perform the training operation by obtaining, from the second communication device, two or more repetitions of an encoded message, wherein the two or more repetitions of the encoded message comprise the erroneous packet, decoding, using joint processing, the two or more repetitions to determine the encoded message, individually decoding each repetition of the two or more repetitions, and recording a decoding indication associated with each repetition to generate a BER profile of a set of BER profiles.

The communication manager 808, the reception component 802, and/or the transmission component may perform the training operation by encoding the random sequence seed to generate an encoded random sequence seed, outputting for transmission the encoded random sequence seed to the second communication device, obtaining, from the second communication device, an encoded sequence corresponding to the random sequence seed, wherein the encoded sequence comprises the erroneous packet, generating a network-generated sequence using the random sequence seed, decoding the encoded sequence to generate a decoded sequence, and determining a BER value based on a comparison between the network-generated sequence and the decoded sequence, where the BER information is based on the BER value.

The communication manager 808, the reception component 802, and/or the transmission component may perform the training operation by generating a binary sequence, encoding the binary sequence to generate an encoded binary sequence, outputting for transmission the encoded binary sequence to the second communication device, obtaining, from the second communication device, an encoded sequence corresponding to the binary sequence, wherein the encoded sequence comprises the erroneous packet, decoding the encoded sequence to generate a decoded sequence, and determining a BER value based on a comparison between the binary sequence and the decoded sequence, where the BER information is based on the BER value.

The determination component 810 may select a BER profile of a set of BER profiles. The determination component 810 may determine, using an SINR-to-BLER mapping, a BLER range associated with a transport block, wherein selecting the selected BER profile comprises selecting the selected BER profile based at least in part on the BLER range. The determination component 810 may determine an estimated BER for the erroneous packet based at least in part on at least one of an intermediate decoding result associated with the erroneous packet or a final decoding result associated with the erroneous packet. The transmission component 804 may output for transmission an indication of the estimated BER.

The determination component 810 may determine the estimated BER by determining a plurality of information bits corresponding to the erroneous packet, determining a number of unreliable bits of the plurality of information bits, and determining the estimated BER based on at least one of the number of unreliable bits, a probability of a bit being wrongly decoded, or a number of information bits of the plurality of information bits.

The reception component 802 may obtain a voice packet. The communication manager 808 may classify the voice packet based at least in part on a decoding result associated with the voice packet. The determination component 810 may determine that a transport block of the voice packet includes an inconsistent CRC corresponding to one or more bits of a specified class. The communication manager 808 may drop the transport block based at least in part on determining that the transport block of the voice packet includes the inconsistent CRC corresponding to the one or more bits of the specified class.

The generation component 812 may generate an RTP packet corresponding to the voice packet. The communication manager 808 and/or transmission component 804 may encapsulate the RTP packet into an IP packet that indicates an IP address of the second communication device as a source IP address.

The reception component 802 and/or the communication manager 808 may decompress a ROHC header. The determination component 810 may determine that a voice packet type of the voice packet is a partially correct type. The communication manager 808 may update (e.g., recalculate) an IP check sum based on an IP payload of the voice packet based at least in part on determining that the voice packet type is a partially correct type. The transmission component 804 may output for transmission the voice packet, including the updated IP check sum, and an indication of a voice packet type of the voice packet.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
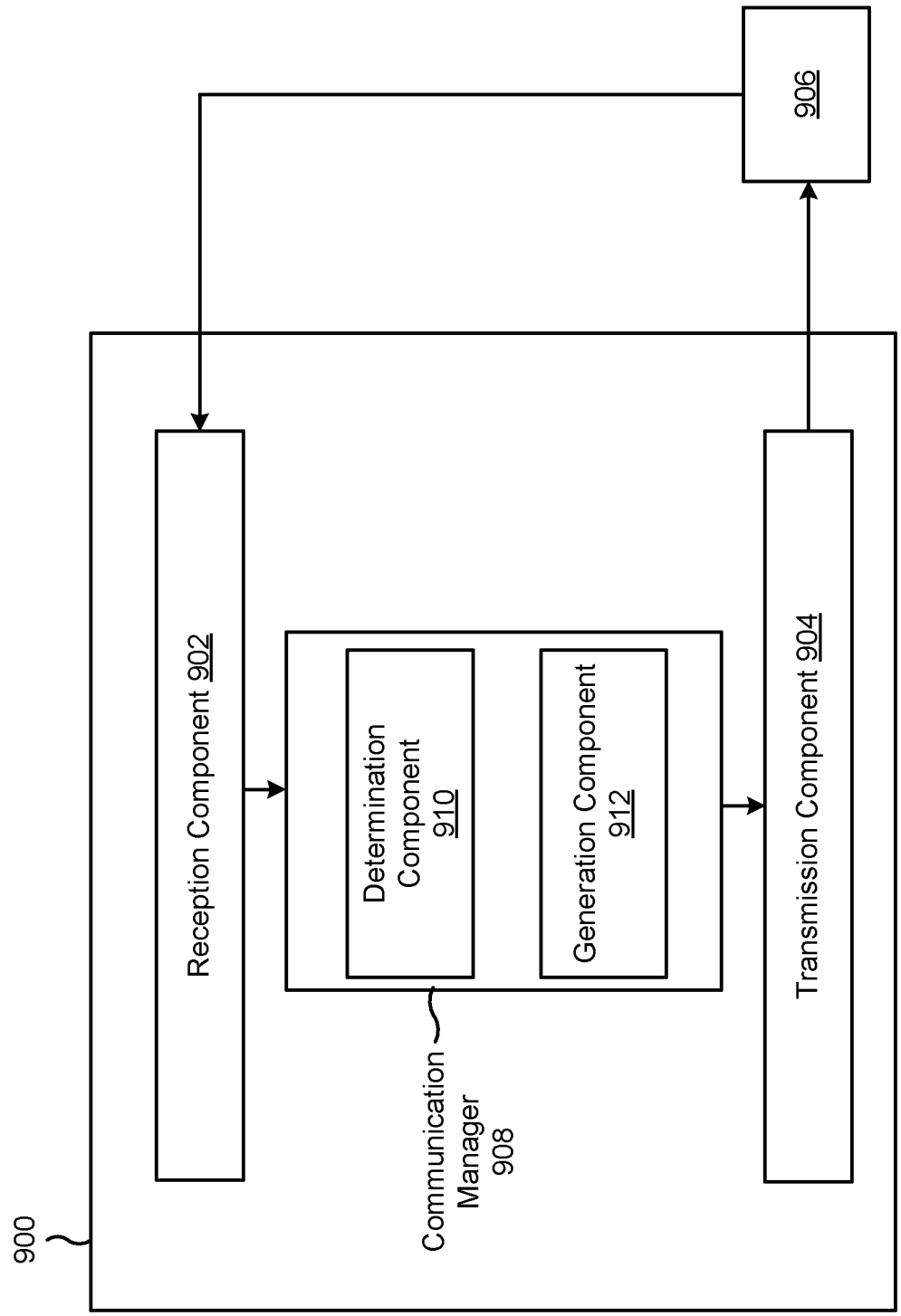

FIG. 9 is a diagram of an example apparatus 900 for wireless communication. The apparatus 900 may be a communication device, or a communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another communication device) using the reception component 902 and the transmission component 904. As further shown, the apparatus 900 may include the communication manager 908. The communication manager 908 may include one or more of a determination component 910, or a generation component 912, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

The reception component 902 may obtain one or more voice communications from a communication device. The determination component 910 may determine BER information associated with the one or more voice communications. The reception component 902 may obtain a plurality of voice packets from the communication device. The reception component 902 may decode, based at least in part on the BER information, at least a portion of at least one voice packet of the plurality of voice packets to generate at least one partially decoded voice packet. The generation component 912 may generate voice data using the least one partially decoded voice packet. In some aspects, the communication manager 908, the determination component 910, and/or the generation component 912 may include one or more antennas, a modem, a modulator, a transmit MIMO processor, a transmit processor, a controller/processor, a memory, or a combination thereof, of the UE described in connection with FIG. 2. In some aspects, the communication manager 908, the determination component 910, and/or the generation component 912 may include the reception component 902 and/or the transmission component 904.

The reception component 902 may receive an indication of a transmission power configuration. The determination component 910 may select a BER profile of the set of BER profiles and generate the voice data based on the selected BER profile. The determination component 910 may determine that a physical layer decoding of a voice packet of the plurality of voice packets is incorrect. The determination component 910 may determine an updated BER profile based at least in part on determining that the physical layer decoding of a voice packet of the plurality of voice packets is incorrect. The determination component 910 may determine an updated BER profile based at least in part on determining that the physical layer decoding of the voice packet of the plurality of voice packets is incorrect. The generation component 912 may generate the voice data based on the updated BER profile. The determination component 910 may determine that the first communication device is connected to an RAT that is different than an RAT associated with the set of BER profiles.

The determination component 910 may determine an updated set of BER profiles based at least in part on determining that the first communication device is connected to the RAT that is different than the RAT associated with the set of BER profiles. The determination component 910 may determine a moving average of a plurality of BLER measurements, wherein determining the updated BER profile comprises determining the updated BER profile based at least in part on the moving average of the BLER measurements.

The determination component 910 may determine an SINR-to-BLER mapping. The determination component 910 may determine, based at least in part on the SINR-to-BLER mapping, a BLER range of a transport block associated with the voice packet, wherein determining the updated BER profile comprises determining the BLER range. The determination component 910 may determine that a BLER at the apparatus satisfies a threshold. The determination component 910 may determine the updated BER profile based at least in part on at least one of a BLER at an originating network node and the BLER at the apparatus.

The communication manager 908 may classify the voice packet based at least in part on a decoding result associated with the voice packet. The determination component 910 may determine that a voice packet type of the voice packet is a partially correct type. The communication manager 908 and/or the reception component 902 may decode the voice packet using the BER information. The reception component 902 may receive an indication of the voice packet type of the voice packet.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication at a base station, comprising: obtaining an erroneous packet from a first communication device; and outputting an indication of bit error rate (BER) information, based on the erroneous packet, to a second communication device to facilitate error mitigation at the second communication device.

Aspect 2: The method of Aspect 1, wherein the BER information comprises a set of BER profiles.

Aspect 3: The method of Aspect 2, wherein a BER profile of the set of BER profiles indicates a fraction of transport blocks within each of a plurality of BER ranges.

Aspect 4: The method of any of Aspects 1-3, further comprising determining a plurality of BER distributions, wherein each BER distribution of the plurality of BER distributions is associated with at least one block error rate, wherein the BER information is based on the plurality of BER distributions.

Aspect 5: The method of any of Aspects 1-4, further comprising performing at least one of: a simulation or a training operation using voice training data.

Aspect 6: The method of Aspect 5, wherein performing the training operation comprises: obtaining, from the second communication device, two or more repetitions of an encoded message, wherein the two or more repetitions of the encoded message comprise the erroneous packet; decoding, using joint processing, the two or more repetitions to determine the encoded message; individually decoding each repetition of the two or more repetitions; and recording a decoding indication associated with each repetition to generate a BER profile of a set of BER profiles.

Aspect 7: The method of Aspect 5, wherein performing the training operation comprises: generating a random sequence seed; encoding the random sequence seed to generate an encoded random sequence seed; outputting for transmission the encoded random sequence seed to the second communication device; obtaining, from the second communication device, an encoded sequence corresponding to the random sequence seed, wherein the encoded sequence comprises the erroneous packet; generating a network-generated sequence using the random sequence seed; decoding the encoded sequence to generate a decoded sequence; and determining a BER value based on a comparison between the network-generated sequence and the decoded sequence, wherein the BER information is based on the BER value.

Aspect 8: The method of Aspect 5, wherein performing the training operation comprises: generating a binary sequence; encoding the binary sequence to generate an encoded binary sequence; outputting for transmission the encoded binary sequence to the second communication device; obtaining, from the second communication device, an encoded sequence corresponding to the binary sequence, wherein the encoded sequence comprises the erroneous packet; decoding the encoded sequence to generate a decoded sequence; and determining a BER value based on a comparison between the binary sequence and the decoded sequence, wherein the BER information is based on the BER value.

Aspect 9: The method of any of Aspects 1-8, further comprising selecting a BER profile of a set of BER profiles, and wherein the BER information comprises the selected BER profile.

Aspect 10: The method of Aspect 9, wherein the BER profile is selected based at least in part on a moving average of a plurality of block error rate measurements.

Aspect 11: The method of Aspect 9, further comprising determining, using a signal to noise-plus-interference ratio to block error rate (BLER) mapping, a BLER range associated with a transport block, wherein the BER profile is selected based at least in part on the BLER range.

Aspect 12: The method of any of Aspects 1-11, wherein the indication of the BER information is output for transmission via a session initiation protocol message, a real-time transport control protocol message, or a real-time transport message.

Aspect 13: The method of any of Aspects 1-12, further comprising: determining an estimated BER for the erroneous packet based at least in part on at least one of an intermediate decoding result associated with the erroneous packet or a final decoding result associated with the erroneous packet; and outputting for transmission an indication of the estimated BER.

Aspect 14: The method of Aspect 13, wherein determining the estimated BER comprises: determining a plurality of information bits corresponding to the erroneous packet; determining a number of unreliable bits of the plurality of information bits; and determining the estimated BER based on at least one of the number of unreliable bits, a probability of a bit being wrongly decoded, or a number of information bits of the plurality of information bits.

Aspect 15: The method of any of Aspects 1-14, further comprising: obtaining a voice packet; and classifying the voice packet based at least in part on decoding results associated with the voice packet.

Aspect 16: The method of Aspect 15, wherein the classification comprises: an assignment of a fully correct classification type to the voice packet if the voice packet is successfully decoded, or an assignment of a partially correct classification type to the voice packet if the voice packet is not successfully decoded.

Aspect 17: The method of Aspect 15, further comprising: determining that a transport block of the voice packet includes an inconsistent cyclic redundancy check (CRC) corresponding to one or more bits of a specified class; and dropping the transport block based at least in part on determining that the transport block of the voice packet includes the inconsistent CRC corresponding to the one or more bits of the specified class.

Aspect 18: The method of Aspect 15, further comprising: generating a real-time transport (RTP) packet corresponding to the voice packet; and encapsulating the RTP packet into an internet protocol (IP) packet that indicates an IP address of the second communication device as a source IP address.

Aspect 19: The method of Aspect 15, further comprising: decompressing a Robust Header Compression header associated with the voice packet; determining that a voice packet type of the voice packet is a partially correct type; updating an internet protocol (IP) check sum based on an IP payload of the voice packet based at least in part on determining that the voice packet type is a partially correct type; and outputting for transmission the voice packet, including the updated IP check sum, to the second communication device.

Aspect 20: The method of Aspect 15, further comprising outputting for transmission an indication of a voice packet type of the voice packet.

Aspect 21: A method for wireless communication at a user equipment (UE), comprising: obtaining one or more voice communications from a communication device; determining bit error rate (BER) information associated with the one or more voice communications; obtaining a plurality of voice packets from the communication device; decoding, based at least in part on the BER information, at least a portion of at least one voice packet of the plurality of voice packets to generate at least one partially decoded voice packet; and generating voice data using the at least one partially decoded voice packet.

Aspect 22: The method of Aspect 21, wherein the determination comprises receiving an indication of the BER information.

Aspect 23: The method of either of Aspects 21 or 22, wherein the BER information comprises a set of BER profiles.

Aspect 24: The method of Aspect 23, further comprising selecting a BER profile of the set of BER profiles and generate the voice data based on the selected BER profile.

Aspect 25: The method of any of Aspects 21-24, further comprising: determining that a physical layer decoding of a voice packet of the plurality of voice packets is incorrect; and determining an updated BER profile based at least in part on determining that the physical layer decoding of the voice packet of the plurality of voice packets is incorrect; and generating the voice data based on the updated BER profile.

Aspect 26: The method of Aspect 25, further comprising determining a moving average of a plurality of block error rate (BLER) measurements, wherein the updated BER profile is determined based at least in part on the moving average of the BLER measurements.

Aspect 27: The method of Aspect 25, further comprising determining that a block error rate (BLER) at the UE satisfies a threshold, wherein the updated BER profile is determined based on at least one of a BLER at an originating network node or the BLER at the UE.

Aspect 28: The method of any of Aspects 21-27, further comprising classifying the at least one voice packet based at least in part on a decoding result associated with the at least one voice packet.

Aspect 29: An apparatus for wireless communication, comprising one or more processors; a memory coupled with the one or more processors; and instructions stored in the memory and executable by the one or more processors to cause the apparatus to perform the method of one or more of Aspects 1-20.

Aspect 30: A base station, comprising a transceiver, a memory comprising instructions and one or more processors configured to execute the instructions and cause the base station to perform the method of one or more of Aspects 1-20, wherein the transceiver is configured to receive the erroneous packet and to transmit the indication.

Aspect 31: An apparatus for wireless communication, comprising at least one means for performing the method of one or more of Aspects 1-20.

Aspect 32: A non-transitory computer-readable medium storing code for wireless communication, the code comprising instructions executable by one or more processors to perform the method of one or more of Aspects 1-20.

Aspect 33: A non-transitory computer-readable medium storing a set of instructions for wireless communication, the set of instructions comprising one or more instructions that, when executed by one or more processors of a device, cause the device to perform the method of one or more of Aspects 1-20.

Aspect 34: An apparatus for wireless communication, comprising one or more processors; a memory; and instructions stored in the memory and executable by the one or more processors to cause the apparatus to perform the method of one or more of Aspects 21-28.

Aspect 35: A user equipment (UE), comprising a transceiver, a memory comprising instructions and one or more processors configured to execute the instructions and cause the UE to perform the method of one or more of Aspects 21-28, wherein the transceiver is configured to obtain one or more voice communications, obtain a plurality of voice packets, and decode at least a portion of at least one voice packet of the plurality of voice packets, and wherein the one or more processors are configured to determine bit error rate information and to generate voice data.

Aspect 36: An apparatus for wireless communication, comprising at least one means for performing the method of one or more of Aspects 21-28.

Aspect 37: A non-transitory computer-readable medium storing code for wireless communication, the code comprising instructions executable by a processor to perform the method of one or more of Aspects 21-28.

Aspect 38: A non-transitory computer-readable medium storing a set of instructions for wireless communication, the set of instructions comprising one or more instructions that, when executed by one or more processors of a device, cause the device to perform the method of one or more of Aspects 21-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
   one or more memories comprising instructions; and
   one or more processors configured to execute the instructions and cause the apparatus to:
      obtain an erroneous packet from a first communication device; and
      output an indication of bit error rate (BER) information, based at least in part on the erroneous packet, to a second communication device to facilitate error mitigation at the second communication device, wherein the BER information comprises a set of BER profiles and a BER profile of the set of BER profiles indicates a fraction of transport blocks within each of a plurality of BER ranges.

2. The apparatus of claim 1, wherein the indication of the BER information is output for transmission via:
   a session initiation protocol message,
   a real-time transport control protocol message, or
   a real-time transport message.

3. The apparatus of claim 1, wherein the one or more processors are further configured to cause the apparatus to:
   obtain a voice packet from the first communication device; and
   classify the voice packet based at least in part on a decoding result associated with voice packet.

4. The apparatus of claim 3, wherein the classification comprises:
   an assignment of a fully correct classification type to the voice packet if the voice packet is successfully decoded, or
   an assignment of a partially correct classification type to the voice packet if the voice packet is not successfully decoded.

5. The apparatus of claim 3, wherein the one or more processors are further configured to cause the apparatus to:
   drop a transport block of the voice packet based at least in part on the transport block including an inconsistent cyclic redundancy check (CRC) corresponding to one or more bits of a particular class.

6. The apparatus of claim 3, wherein the one or more processors are further configured to cause the apparatus to:
   generate a real-time transport (RTP) packet corresponding to the voice packet; and
   encapsulate the RTP packet into an internet protocol (IP) packet that indicates an IP address of the second communication device as a source IP address.

7. The apparatus of claim 3, wherein the one or more processors are further configured to cause the apparatus to:

decompress a Robust Header Compression header associated with the voice packet;
update an internet protocol (IP) check sum based at least in part on an IP payload of the voice packet and based at least in part on a voice packet type of the voice packet being identified as a partially correct type; and
output for transmission the voice packet, including the updated IP check sum.

8. The apparatus of claim 3, wherein the one or more processors are further configured to cause the apparatus to:
output for transmission an indication of a voice packet type of the voice packet.

9. The apparatus of claim 1, further comprising:
a transceiver configured to receive the erroneous packet and to transmit the indication, wherein the apparatus is configured as a network node.

10. A method of wireless communication performed at a network node, comprising:
obtaining an erroneous packet from a first communication device; and
outputting an indication of bit error rate (BER) information, based at least in part on the erroneous packet, to a second communication device to facilitate error mitigation at the second communication device, wherein the BER information comprises a set of BER profiles and a BER profile of the set of BER profiles indicates a fraction of transport blocks within each of a plurality of BER ranges.

11. The method of claim 10, wherein the indication of the BER information is output for transmission via:
a session initiation protocol message,
a real-time transport control protocol message, or
a real-time transport message.

12. The method of claim 10, further comprising:
obtaining a voice packet from the first communication device; and
classifying the voice packet based at least in part on a decoding result associated with the voice packet.

13. The method of claim 12, further comprising:
dropping a transport block of the voice packet based at least in part on the transport block including an inconsistent cyclic redundancy check (CRC) corresponding to one or more bits of a particular class.

14. An apparatus for wireless communication, comprising:
one or more memories comprising instructions; and
one or more processors configured to execute the instructions to cause the apparatus to:
obtain an erroneous packet from a first communication device;
output an indication of bit error rate (BER) information, based at least in part on the erroneous packet, to a second communication device to facilitate error mitigation at the second communication device; and
output for transmission an indication of an estimated BER, the estimated BER being based at least in part on at least one of:
an intermediate decoding result associated with the erroneous packet,
a final decoding result associated with the erroneous packet,
a number of unreliable bits of a plurality of information bits corresponding to the erroneous packet,
a probability of a bit being wrongly decoded, or
a number of information bits of the plurality of information bits.

15. The apparatus of claim 14, wherein the indication of the BER information is output for transmission via:
a session initiation protocol message,
a real-time transport control protocol message, or
a real-time transport message.

16. The apparatus of claim 14, further comprising:
a transceiver configured to receive the erroneous packet and to transmit the indication of the BER information and the indication of the estimated BER, wherein the apparatus is configured as a network node.

\* \* \* \* \*